US011780474B2

(12) United States Patent
Taniguchi

(10) Patent No.: US 11,780,474 B2
(45) Date of Patent: Oct. 10, 2023

(54) VEHICLE TRAVEL CONTROL METHOD AND VEHICLE TRAVEL CONTROL DEVICE

(71) Applicants: Nissan Motor Co., Ltd., Yokohama (JP); Renault S.A.S., Boulogne-Billancourt (FR)

(72) Inventor: Hiroki Taniguchi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/618,200

(22) PCT Filed: Jun. 13, 2019

(86) PCT No.: PCT/IB2019/000590
§ 371 (c)(1),
(2) Date: Dec. 10, 2021

(87) PCT Pub. No.: WO2020/249989
PCT Pub. Date: Dec. 17, 2020

(65) Prior Publication Data
US 2022/0266858 A1    Aug. 25, 2022

(51) Int. Cl.
*B60W 60/00*    (2020.01)
*B60W 30/10*    (2006.01)
(Continued)

(52) U.S. Cl.
CPC .......... *B60W 60/007* (2020.02); *B60W 30/10* (2013.01); *B60W 30/18163* (2013.01);
(Continued)

(58) Field of Classification Search
CPC .......... B60W 30/10; B60W 30/18163; B60W 60/001; B60W 60/007; B60W 2520/06;
(Continued)

(56) References Cited

U.S. PATENT DOCUMENTS

2017/0073000 A1    3/2017  Numazaki et al.
2017/0259819 A1    9/2017  Takeda
(Continued)

FOREIGN PATENT DOCUMENTS

CN    109715453 A  *  5/2019  ................ B60T 8/17
JP    2016-215790 A    12/2016
(Continued)

*Primary Examiner* — Anshul Sood
(74) *Attorney, Agent, or Firm* — Young Basile Hanlon & MacFarlane, P.C.

(57) ABSTRACT

When an own vehicle changes lanes to another lane different from the traveling lane by override, a traveling control device for a vehicle generates a first travelable area in the traveling lane based on the predicted traveling trajectory in accordance with the override of the own vehicle and generates a second travelable area along the other lane. The traveling control device for the vehicle generates a third travelable area by connecting the first travelable area and the second travelable area, generates an own vehicle traveling trajectory within the third travelable area and controls a motion of the own vehicle so that the own vehicle travels along the own vehicle traveling trajectory.

16 Claims, 8 Drawing Sheets

(51) Int. Cl.
  *B60W 30/08* (2012.01)
  *B60W 30/18* (2012.01)
(52) U.S. Cl.
  CPC ....... *B60W 60/001* (2020.02); *B60W 2520/06* (2013.01); *B60W 2520/10* (2013.01); *B60W 2520/14* (2013.01); *B60W 2540/18* (2013.01); *B60W 2552/10* (2020.02); *B60W 2720/10* (2013.01)
(58) Field of Classification Search
  CPC ......... B60W 2520/10; B60W 2520/14; B60W 2540/18; B60W 2552/10; B60W 2720/10
  See application file for complete search history.

(56) References Cited

U.S. PATENT DOCUMENTS

| | | | |
|---|---|---|---|
| 2017/0334446 A1 | 11/2017 | Bosch et al. | |
| 2018/0154825 A1* | 6/2018 | Tanaka | G06V 20/58 |
| 2018/0188031 A1* | 7/2018 | Samper | G01C 21/28 |
| 2019/0049974 A1* | 2/2019 | Kato | G08G 1/166 |
| 2019/0064813 A1* | 2/2019 | Binet | G05D 1/0212 |
| 2019/0355257 A1* | 11/2019 | Caldwell | G08G 1/166 |
| 2020/0269920 A1* | 8/2020 | Millsap | B62D 15/0205 |

FOREIGN PATENT DOCUMENTS

| | | |
|---|---|---|
| JP | 2017-052486 A | 3/2017 |
| JP | 2017-165153 A | 9/2017 |
| JP | 2018-202876 A | 12/2018 |
| JP | 2018-203120 A | 12/2018 |
| JP | 2019-034627 A | 3/2019 |

\* cited by examiner

VEHICLE TRAVEL CONTROL METHOD AND VEHICLE TRAVEL CONTROL DEVICE

TECHNICAL FIELD

The present invention relates to a traveling control method and a traveling control device for a vehicle for controlling the traveling of the own vehicle.

BACKGROUND

In case automatic driving control is executed for autonomous driving by a running control device to follow a target trajectory and perform autonomous driving, it is necessary to avoid obstacles by intervention of steering operation of a driver, when obstacles such as a street-parking vehicle exists on a target trajectory. In this case, the running control of the own vehicle becomes an override state in which manual operation control takes precedence over the automatic operation control. Conventional traveling control device corrects a command value of steering control by automatic operation control according to an intention of the driver at the time of override of the own vehicle.

SUMMARY

However, in the steering system of JP2017-052486A, the lane change of the vehicle by override is not considered. Therefore, when the own vehicle changes lane by the intervention of manual operation control by the driver, switching between the manual operation control and the automatic operation control is not smoothly performed, and so there is a possibility that a motion of the vehicle is not stable.

A problem to be solved by the present invention is to provide a traveling control method and a traveling control device for a vehicle capable of stabilizing the motion of the own vehicle when an autonomous vehicle performing autonomous traveling changes the lane by an override.

The present invention solves the above-described problems by generating a trajectory in consideration of the override of the own vehicle and controlling the motion of the own vehicle to change lanes by traveling along the generated trajectory when the autonomous vehicle traveling autonomously changes lanes by override.

According to the present invention, since the autonomous vehicle follows the trajectory generated in consideration of the override, when the autonomous vehicle performing the autonomous driving changes lanes by the override, it is possible to stabilize the motion of the own vehicle.

DETAILED DESCRIPTION

First Embodiment

Hereinafter, a traveling control device 100 for a vehicle according to the first embodiment, which is the best embodiment of the present invention, will be described with reference to FIGS. 1-4.

Figure 1:
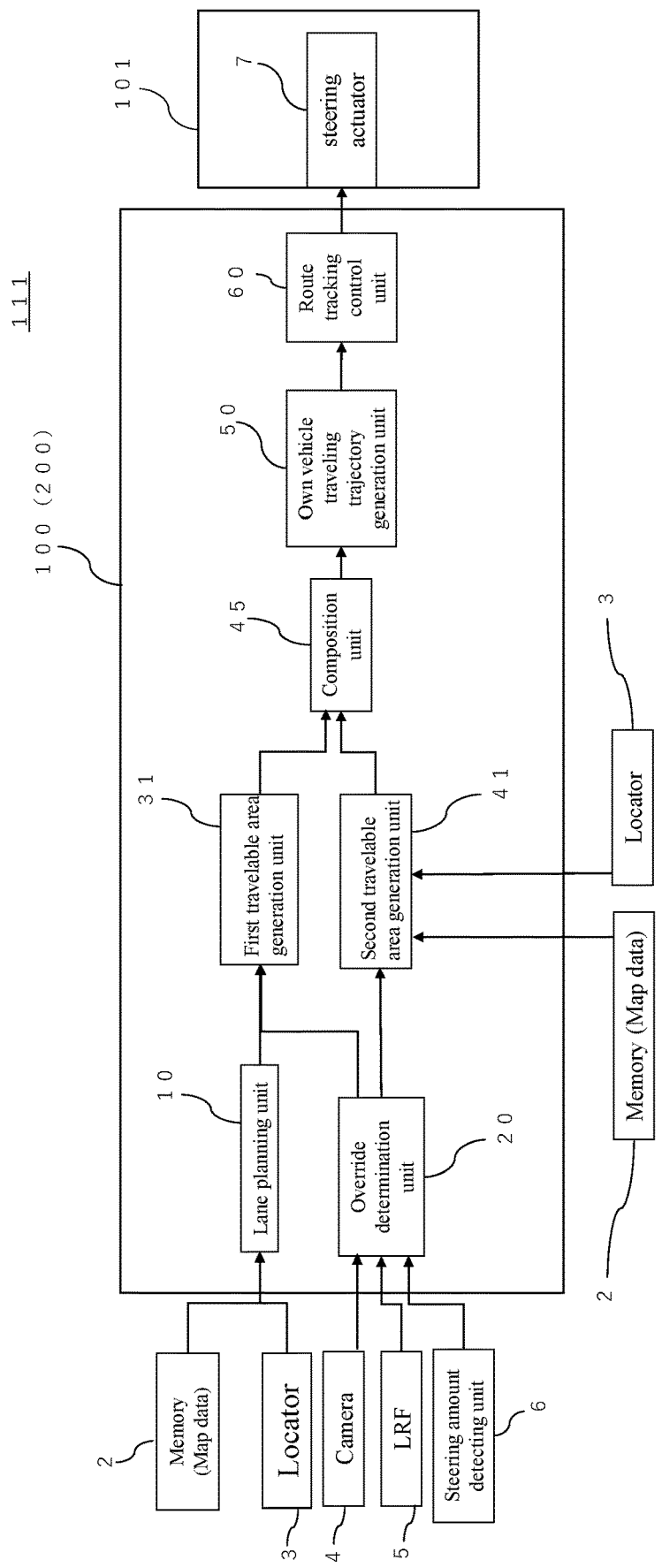
FIG. 1 is a block diagram showing a configuration of a traveling control system including a traveling control device of the first embodiment.

As shown in FIG. 1, the traveling control system 111 includes a traveling control device 100 that executes automatic driving control for autonomous traveling of the own vehicle 101. The traveling control system 111 includes a memory 2, a locator 3, a camera 4, an LRF (Laser Range Finder) 5, a steering amount detecting unit 6, and a steering actuator 7. The traveling control device 100 controls various actuators including the steering actuator 7 so that the own vehicle 101 can autonomously travel based on the information acquired from the memory 2, the locator 3, the camera 4, LRF5, and the steering amount detecting unit 6.

The memory 2 stores three-dimensional high-definition map information based on a road shape detected when a vehicle for data acquisition is used to travel on an actual road. The three-dimensional high-definition map information stored in the memory 2 includes, in addition to the map information, border information, two-dimensional position information, three-dimensional position information, road information, road-attribute information, upstream information, downstream information, lane discrimination information, connection-destination lane information, and the like at the respective map coordinates. The road information and the road attribute information include information such as road widths, radius of curvature, road shoulder structures, road traffic regulations (speed limits, availability of lane changes, etc.), road junction points, branch points, tollgates, lane count reduction points, service/parking areas, etc.

The locator 3 is composed of a GPS unit, a gyro sensor, and a vehicle speed sensor or the like. The locator 3 detects the radio waves transmitted from the plurality of satellite communications by the GPS unit, periodically acquires the position information of the own vehicle 101, and periodically detects the current position information of the own vehicle 101 on the basis of the obtained position information of the own vehicle 101, the angle change information acquired from the gyro sensor, and the vehicle speed acquired from the vehicle speed sensor.

The camera 4 is composed of an image sensor such as a CCD wide-angle camera. The camera is provided on a front part, a rear part and both sides as appropriate. The camera acquires image information by imaging the periphery of the own vehicle 101. The camera 4 may be a stereoscopic camera or an omnidirectional camera and may include a plurality of the image sensors. The camera 4 detects, from the acquired image data, the road and structures, road signs, signs, other vehicles, two-wheeled vehicles, bicycles, pedestrians, and the like existing in front of the own vehicle 101 as the surrounding conditions of the own vehicle 101.

LRF 5 is provided on the front part, the rear part, and the both sides of the own vehicle 101 and irradiates millimeter waves or ultrasonic waves to the periphery of the own vehicle 101 to scan a predetermined area around the periphery of the own vehicle 101. Thus, LRF 5 detects obstacles such as other vehicles, motorcycles, bicycles, pedestrians, curbs on road shoulders, guardrails, wall-surfaces, embankments, etc. that are present around the own vehicle 101. For example, LRF5 detects the relative position (bearing) between the obstacle and the own vehicle 101, the relative speed of the obstacle, the distance from the own vehicle 101 to the obstacle, and the like as the surrounding situation of the own vehicle 101.

The steering amount detecting unit 6 is, for example, a sensor for detecting a rotation angle of a steering shaft (not shown) and detects a steering amount of the own vehicle 101.

The steering actuator 7 is made of, for example, a motor capable of transmitting torque to the steering shaft, and controls steering of the own vehicle 101 in accordance with a command value of automatic operation control by the traveling control device 100 or an operation of the steering wheel 103 by the driver.

The traveling control device 100 is configured by one or more computers and software installed in the computers. The traveling control device 100 includes ROM that stores a program for performing an automatic operation control function, CPU that executes a program stored in the ROM, and RAM that functions as an accessible storage device. The traveling control device 100 includes a lane planning unit 10, an override determination unit 20, a first travelable area generation unit 31, a second travelable area generation unit 41, a composition unit 45, a own vehicle traveling trajectory generation unit 50, and a route tracking control unit 60.

Next, an outline of the overall control by the traveling control device 100 will be described with reference to FIG. 2.

First, the traveling control device 100 estimates the self-position based on position information and map information of the memory 2 of the own vehicle 9 obtained by the locator 3 (step S1). Further, the traveling control device 100 recognizes pedestrians or other obstacles around the own vehicle 101 by the camera 4 and LRF5 (step S2). The information of the self-position estimated in step S1 and the information of the obstacle or the like recognized in step S2 are presented on the map information stored in the memory 2 (step S3).

Further, when a destination is input by the driver and an instruction to start autonomous driving control is input, the destination is set on the map information of the memory 2 (step S4), and route planning from the current location to the destination is performed (step S5). Actions of the own vehicle 101 is determined based on the map information (step S6). Specifically, for example, at each location of a plurality of intersections existing in a planned route, it is determined in which direction the own vehicle 101 turns or the like. Then, on the map information of the memory 2, drive zone planning is performed (step S7). Specifically, at a predetermined position or at predetermined intervals on the route, it is appropriately set which lane the own vehicle 101 should travel. Then, the traveling control device 100 sets a target trajectory of the own vehicle 101 based on the position information of the entered current location and destination, the set route information, the information of the drive zone, the information of the obstacles recognized by the camera 4 and LRF5, and the like (step S8). Furthermore, the traveling control device 100 controls motion of various actuators of the own vehicle 101 so that the own vehicle 101 tracks the target trajectory (step S9).

A traveling control method for the traveling control device 100 to set the own vehicle traveling trajectory as a target trajectory in step S8 described in FIG. 2 will be described in more detail with reference to FIGS. 1, 3, and 4.

Figure 2:
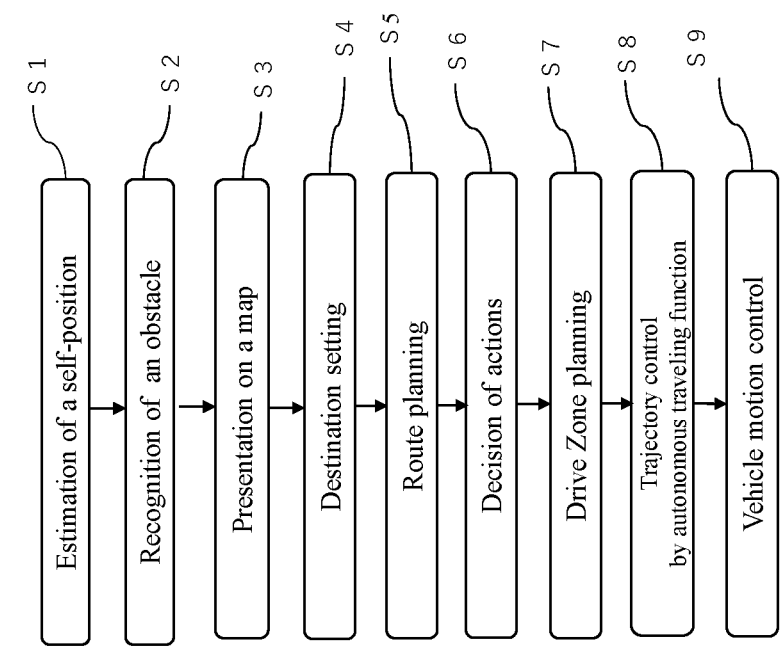
FIG. 2 is a flowchart showing an outline of the control by the traveling control device shown in FIG. 1.
Figure 3:
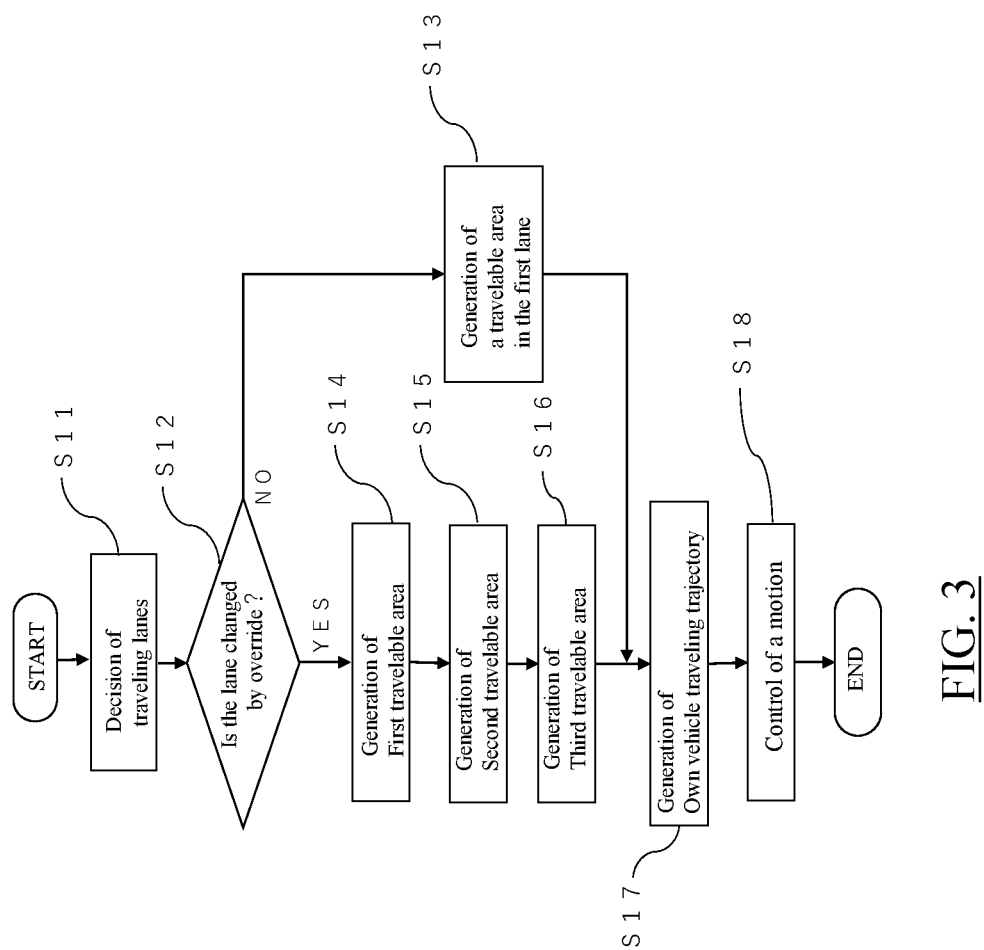
FIG. 3 is a flowchart showing a method of generating the own vehicle traveling trajectory by the traveling control device shown in FIG. 1.

First, as shown in FIG. 3, the lane planning unit 10 of the traveling control device 100 plans a drive zone based on the map data of the memory 2 and the vehicle position information estimated by the locator 3, and determines which lane the own vehicle 101 should travel in (Step S11). Here, planning the drive zone by the lane planning unit 10 corresponds to Step S7 shown in FIG. 2. In the example of FIG. 4, the lane planning unit 10 plans the drive zone so that the own vehicle 101 travels in the first lane 70 on the left side. That is, the lane planning unit 10 acquires the left end boundary 77 and the right side boundary 78 of the first lane 70, and plans the drive zone so that the own vehicle 101 travels between the left end boundary 77 and the right side boundary 78 of the first lane 70. The boundary 78 on the right side of the first lane 70 is a lane boundary line between the first lane 70 and the second lane 80 adjacent to the first lane 70.

Further, as shown in FIG. 3, the override determination unit 20 determines whether or not the control of the own vehicle 101 is switched from the automatic driving control to the state of the override and the own vehicle changes lanes (Step 12). Specifically, as shown in FIG. 4, when the own vehicle 101 is traveling in the first lane 70 by the automatic operation control of the traveling control device 100 and there is a street-parking vehicle 1 in the traveling direction of the own vehicle 101, the driver operates the steering wheel 103 and tries to change lanes to the adjacent second lane 80 to avoid the street-parking vehicle 1. Thus, the control of the own vehicle 101 becomes the state of the override, and the own vehicle changes lanes. The override is a state in which the driver has a control of the own vehicle 101. That is, when the control of the own vehicle 101 is in the state of the override, the manual operation control by the driver takes precedence to the automatic operation control by the traveling control device 100. The second lane 80 is a lane that exists in the direction in which the override of the own vehicle 101 is executed.

The override determination unit 20 detects that the control of the own vehicle 101 is switched to the state of the override by detecting steering control by the driver based on steering amount detected by the steering amount detection unit 6, and determines whether or not the own vehicle 101 changes lanes. Further, the override determination unit 20 may predict that the own vehicle 101 changes lanes by the override when the street-parking vehicle 1 as an obstacle is detected by the camera 4 and LRF5 mounted on the own vehicle 101 and when the override of the own vehicle 101 is detected. Incidentally, the obstacle detected by the camera 4 and LRF5 mounted on the own vehicle 101 is not limited to the street-parking vehicle 1. The obstacle may be a preceding vehicle, a bicycle, a motorcycle or the like.

When it is determined that the own vehicle 101 doesn't change lanes by the override in step S12 of FIG. 3, the process proceeds to step S13, and the traveling control device 100 generates a travelable area along the first lane 70. In this case, a travelable area is not generated in the second lane 80.

Figure 4:
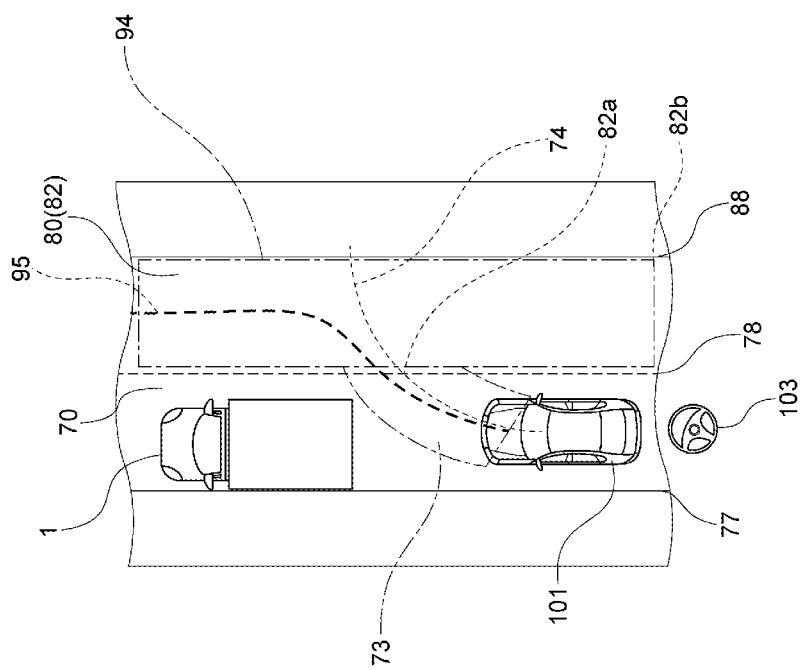
FIG. 4 is a diagram showing an example of the own vehicle traveling trajectory generated by the traveling control device shown in FIG. 1.

On the other hand, in Step S12, when it is determined that the control of the own vehicle 101 is switched to the state of the override by the override determination unit 20 and the own vehicle changes lanes, the first travelable area generation unit 31 generates the first travelable area 73 in which the own vehicle 101 can travel, as shown in FIG. 4 (Step S14). The first travelable area 73 is generated along the predicted traveling trajectory 74 calculated according to the current steering angle and the current vehicle speed of the own vehicle 101 by the steering control of the driver. The predicted traveling trajectory 74 may be calculated according to the current yaw rate and the current vehicle speed of the own vehicle 101.

Further, when it is determined that the control of the own vehicle 101 is switched to the state of the override by the override determination unit 20 and the own vehicle 101 changes lanes to the second lane 80, the second travelable area generation unit 41 generates the second travelable area 82 so that the second travelable area matches the shape of the second lane 80 (Step S15). The position of the second lane 80 is recognized based on the map information stored in the memory 2 and the vehicle position information estimated by the locator 3. Further, the second travelable area generation unit 41 acquires the left boundary 78 of the second lane 80 and the right boundary 88 of the second lane 80 from the map information of the memory 2. Thus, the second travelable area 82 is generated between the left boundary 78 and the right boundary 88 of the second lane 80. Incidentally, the left side of the boundary 78 of the second lane 80 is a lane boundary line between the first lane 70 and the second lane 80. Further, as shown in FIG. 4, the second travelable area 82 is generated from at least a position 82b on a side of the own vehicle 101 in a traveling direction of the first lane 70 relative to a position 82a at which the predicted traveling trajectory 74 is contact with the second lane 80.

In step S16, the composition unit 45 combines the first travelable area 73 and the second travelable area 82 to generate the third travelable area 94. Further, the own vehicle traveling trajectory generation unit 50 generates the own vehicle traveling trajectory 95 within the third travelable area 94 (Step S17). Further, when it is determined that the own vehicle 101 doesn't change lanes by the override, the own vehicle traveling trajectory generation unit 50 generates the own vehicle traveling trajectory 95 within the travelable area along the first lane 70 (Step S17). Here, the control from the determination of the override of the own vehicle 101 by the override determination unit 20 to the generation of the own vehicle traveling trajectory 95 by the own vehicle traveling trajectory generation unit 50 corresponds to the trajectory control of Step S8 shown in FIG. 2.

Next, the route tracking control unit 60 controls the motion of the steering actuator 7 of the own vehicle 101 so that the own vehicle 101 travels following the own vehicle traveling trajectory 95 (Step S18). Here, in the first lane 70, the route tracking control unit 60 controls the motion of the own vehicle 101 so that the own vehicle 101 travels in the first travelable area 73. Further, in the second lane 80, the route tracking control unit 60 controls the motion of the own vehicle 101 so that the own vehicle 101 travels in the second travelable area 82. The control of the steering actuator 7 by the route tracking control unit 60 corresponds to the control of the motion of the own vehicle in step S9 shown in FIG. 2.

As described above, when it is determined that the own vehicle 101 changes lanes by override, the traveling control device 100 according to this embodiment generates a third travelable area 94 by connecting the first travelable area 73 and the second travelable area 82. The first travelable area 73 is generated in the first lane 70 in which the own vehicle 101 travels. Further, the second travelable area 82 is generated in the second lane 80 that exists in the direction in which the override of the own vehicle 101 is executed. Then, the traveling control device 100 generates the own vehicle traveling trajectory 95 in the third travelable area 94. Thus, when the own vehicle 101 traveling autonomously changes lanes by the override, the traveling control device 100 smoothly generates the own vehicle traveling trajectory 95 to be followed by the own vehicle 101 while reflecting the request of the driver. Thus, the traveling control of the own vehicle 101 can smoothly return to the automatic operation control again from the state of the override. Therefore, the motion of the own vehicle 101 at the time of lane change by the override is stabilized.

Further, the traveling control device 100 according to this embodiment generates the travelable area in the first lane 70 even when the own vehicle 101 does not change lanes by the override. Then, the traveling control device 100 generates the own vehicle traveling trajectory so that the own vehicle 101 travels within the travelable area generated in the first lane 70. In this case, the traveling control device 100 does not generate the travelable area in the adjacent second lane 80 so that the own vehicle 101 continues to travel stably in the first lane 70. Therefore, the traveling control device 100 according to this embodiment generates the second travelable area 82 in the second lane 80 at the timing where the lane change is necessary, while when the lane change is not necessary, generates the own vehicle traveling trajectory in the travelable area of the first lane 70. Thus, even when the own vehicle 101 does not change lanes by the override, the traveling control device 100 can generate the own vehicle traveling trajectory appropriately, and the own vehicle 101 can continue to travel stably along the first lane 70.

Further, when the override is detected when the first travelable area 73 is generated in the first lane 70 in which the own vehicle 101 travels, the second travelable area 82 may be generated in the adjacent second lane 80. That is, in the flowchart of FIG. 3, although the generation of the first travelable area is shown as step S14, the process of generating the first travelable area 73 of step S14 may be between step S11 and step S12 of the flowchart of FIG. 3. When it is determined that the own vehicle changes lanes by the override in step S12, the process may flow from step S12 to step S15.

Further, in this embodiment, the first travelable area 73 is generated based on the predicted traveling trajectory 74 in accordance with the override of the own vehicle 101. Thus, the own vehicle traveling trajectory 95 based on the traveling trajectory requested by the driver is easily generated. Therefore, the own vehicle travel trajectory 95 becomes a trajectory reflecting the request of the driver, and so it is possible to suppress the uncomfortable feeling that the driver feels during the own vehicle traveling.

Further, the second travelable area 82 is generated from at least the position 82b on a side of the own vehicle 101 in the traveling direction of the first lane 70 relative to a position 82a at which the predicted traveling trajectory 74 is contact with the second lane 80. Thus, since it is possible to prevent separating the predicted traveling trajectory 74 and the second travelable area 82, it is possible to more reliably generate the own vehicle traveling trajectory 95 of the own vehicle traveling from the first lane 70 to the second lane 80.

Further, the second travelable area 82 is formed to match the shape of the second lane 80 and along the extending direction of the second lane 80. Thus, the own vehicle 101 can change lanes to the second lane 80 more smoothly along the own vehicle traveling trajectory 95.

Further, when an obstacle such as the street-parking vehicle 1 is detected on the first lane 70 in front of the own vehicle 101 and an override of the own vehicle 101 is detected, the override determination unit 20 determines that the own vehicle 101 changes lanes to the second lane 80 by the override. Thus, the traveling control device 100 can reliably generate the third travelable area 94 and the own vehicle traveling trajectory 95, and so the own vehicle 101 can change lanes more smoothly while avoiding obstacles.

Further, the route tracking control unit 60 of the traveling control device 100 controls the motion of the own vehicle 101 so that the own vehicle 101 travels in the first travelable area 73 in the first lane 70. Further, in the second lane 80, the route tracking control unit 60 controls the motion of the own vehicle 101 so that the own vehicle 101 travels in the second travelable area 82. Thus, the traveling control device 300 can smoothly drive the own vehicle 101 along the own vehicle traveling trajectory 95 while reflecting the steering control by the driver to the motion of the own vehicle 101.

Further, the first travelable area 73 is generated based on the predicted traveling trajectory 74 calculated from the current steering angle and the current vehicle speed of the own vehicle 101 or from the current yaw rate and the current vehicle speed. Thus, the traveling control device 100 can generate the own vehicle traveling trajectory 95 according to the actual traveling situation and the request of the driver.

Further, the traveling control device 100 controls the traveling of the own vehicle 101 so that the own vehicle 101 travels along the own vehicle traveling trajectory 95 while decelerating at a timing at which the own vehicle 101 changes lanes by the override. Thus, the own vehicle 101 can more reliably follow the own vehicle running trajectory 95.

The width of the first travelable area 73 is variable, and when the driver operates the steering wheel 103 twice or more when the lane is changed, the width of the first travelable area 73 may be narrower. As the width of the first travelable area 73 is narrower, the steering control of the driver during the state of the override is more strongly reflected in the generation of the own vehicle traveling trajectory 95. On the other hand, as the width of the first travelable area 73 is wider, the own vehicle traveling trajectory 95 become smoother. Further, the width of the first travelable area 73 may change according to the traveling mode of the own vehicle 101.

Second Embodiment

Next, the traveling control device 200 according to a second embodiment of the present invention will be described with reference to FIG. 5. In this embodiment, the first travelable area 76, the third travelable area 96, and the own vehicle traveling trajectory 97 are formed in a different embodiment from the first travelable area 73, the third travelable area 94, and the own vehicle traveling trajectory 95 of the first embodiment. The traveling control device 200 according to the second embodiment has the same configuration as the traveling control device 100 according to the first embodiment shown in FIG. 1. Further, the flow of the traveling control method for setting the own vehicle traveling trajectory 97 by the traveling control device 200 is the same as the flow shown in FIG. 4. Further, the same reference numerals as those in FIGS. 1 to 4 indicate the same or similar components, and therefore detailed description thereof will be omitted.

Figure 5:
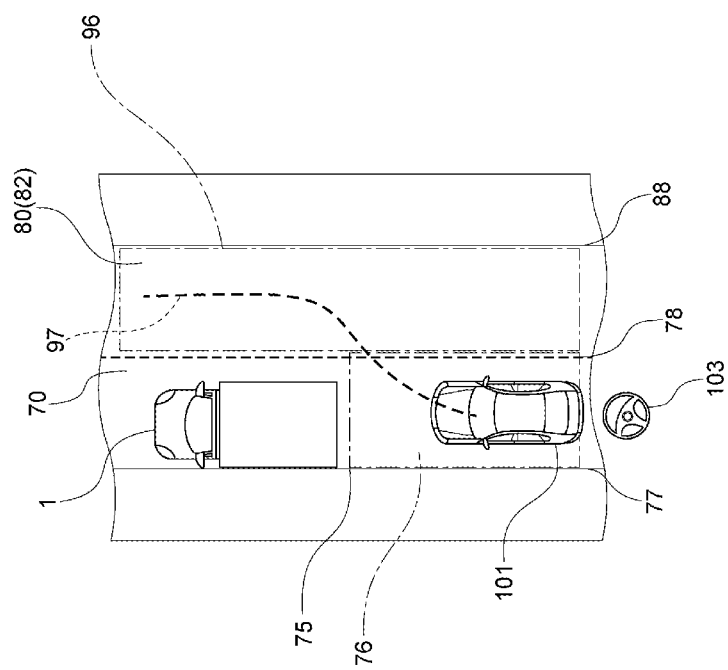
FIG. 5 is a diagram showing an example of the own vehicle traveling trajectory generated by the traveling control device of the second embodiment

As shown in FIG. 5, when there is a street-parking vehicle 1 on the first lane 70 in front of the own vehicle 101, the cameras 4 and LRF5 detect the street-parking vehicle 1 as an obstacle. Then, the override determination unit 20 detects the override of the own vehicle 101 and determines that the own vehicle 101 changes lanes to the second lane 80 by the override. When it is determined that the control of the own vehicle 101 is switched to the override state and the own vehicle changes lanes, the first travelable area generation unit 31 generates the first travelable area 76 that matches the shape of the first lane 70. The first travelable area 76 is generated on the first lane 70 to the point 75 on the front side of the street-parking vehicle 1.

Further, when the override determination unit 20 determines that the control of the own vehicle 101 is switched to the state of the override and the own vehicle 101 changes lanes to the second lane 80, the second travelable area generation unit 41 generates the second travelable area 82 along the second lane 80.

Then, the composition unit 45 combines the first travelable area 76 and the second travelable area 82 to generate the third travelable area 96. Further, the own vehicle traveling trajectory generation unit 50 generates the own vehicle traveling trajectory 97 in the third travelable area 96.

As described above, the traveling control device 200 according to this embodiment generates the first travelable area 76 matching the shape of the first lane 70 and generates the second travelable area 82 matching the shape of the second lane 80. Then, the first travelable area 76 and the second travelable area 82 are connected, the third travelable area 96 is generated. The traveling control device 200 generates the own vehicle traveling trajectory 97 in the third travelable area 96. Thus, since the area in which the own vehicle 101 can travel can be widely set, the area in which the own vehicle traveling trajectory 97 can be generated is expanded. Therefore, it is possible to generate the own vehicle traveling trajectory 97 that does not cause a feeling of strangeness of an occupant of the own vehicle 101.

The first travelable area 76 is generated on the first lane 70 to the point 75 in front of the street-parking vehicle 1 as an obstacle detected by the camera 4 and LRF 5. As a result, the own vehicle 101 can smoothly change lanes while reliably avoiding the street-parking vehicle 1.

Third Embodiment

Next, a traveling control device 300 according to a third embodiment of the present invention will be described with reference to FIGS. 6 to 8. The same reference numerals as those in FIGS. 1 to 5 describe the same or similar components, and therefore detailed description thereof is omitted.

Figure 6:
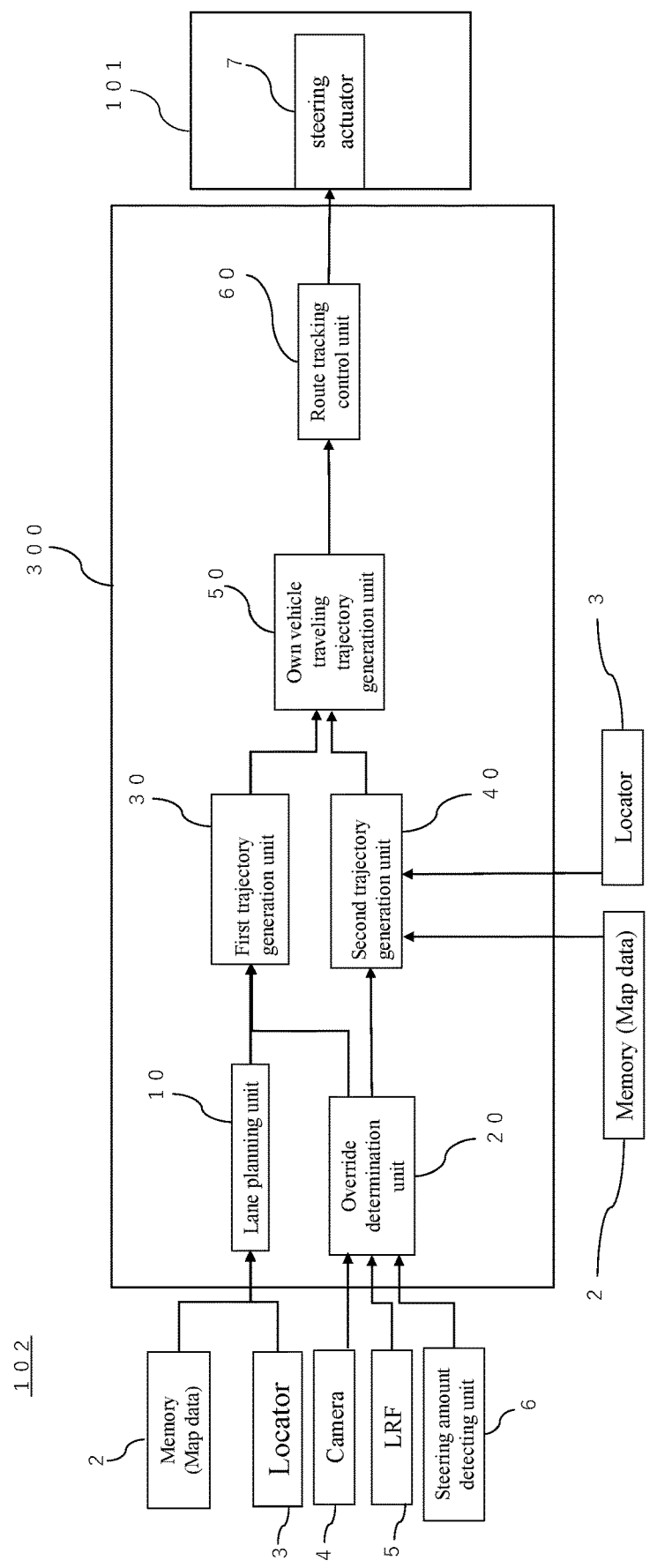
FIG. 6 is a block diagram showing a configuration of a traveling control system including a traveling control device of the third embodiment

The traveling control device 300 of the control system 102 shown in FIG. 6 changes the first travelable area generation unit 31 of the traveling control device 100 shown in FIG. 1 to the first trajectory generation unit 30 and the second travelable area generation unit 41 of the traveling control device 100 shown in FIG. 1 to the second trajectory generation unit 40, respectively. Further, the traveling control device 300 is not provided with a configuration corresponding to the composition unit 45 of the traveling control device 100.

Figure 7:
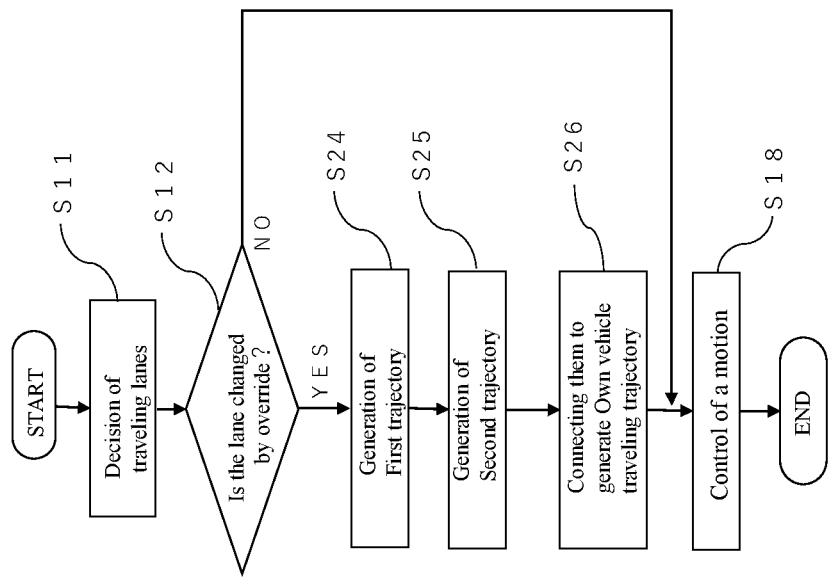
FIG. 7 is a flowchart showing a method of generating the own vehicle traveling trajectory by the traveling control device shown in FIG. 6
Figure 8:
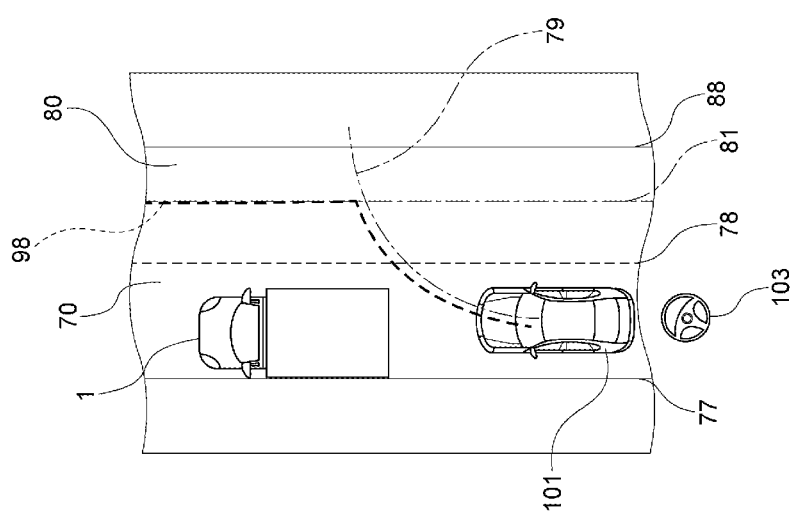
FIG. 8 is a diagram showing an example of the own vehicle traveling trajectory generated by the traveling control device shown in FIG. 6.

As shown in FIGS. 7 and 8, when the override determination unit 20 determines that the control of the own vehicle 101 is switched to the state of the override and the own vehicle 101 changes lanes, the first trajectory generation unit 30 generates the first trajectory 79 in accordance with the override of the own vehicle 101 (Step S24). Specifically, the first trajectory 79 is generated according to the current steering angle and the current vehicle speed of the own vehicle 101 by the steering control of the driver. The first trajectory 79 may be generated according to the current yaw rate and the current vehicle speed of the own vehicle 101.

Further, when the override determination unit 20 determines that the control of the own vehicle 101 is switched to the state of the override and the own vehicle 101 changes lanes to the second lane 80, the second trajectory generation unit 40 generates the second trajectory 81 along the second lane 80 (Step S25). The second trajectory 81 is generated to pass through the center between the boundaries 78, 88 of the second lane 80.

Then, the own vehicle traveling trajectory generation unit 50 combines the first trajectory 79 and the second trajectory 81 to generate the own vehicle traveling trajectory 98 (Step S26). Furthermore, the route tracking control unit 60 controls the motion of the steering actuator 7 of the own vehicle 101 so that the own vehicle 101 travels following the own vehicle traveling trajectory 98 (Step S18). When it is determined in step S12 that the own vehicle 101 does not change lanes by the override, in step S18, the route tracking control unit 60 controls the motion of the own vehicle 101 so that the own vehicle 101 follows the own vehicle traveling trajectory and travels in the first lane 70.

Here, the determination of the override of the own vehicle 101 by the override determination unit 20, the generation of the first trajectory 79 by the first trajectory generation unit 30, the generation of the second trajectory 81 by the second trajectory generation unit 40, and the generation of the own vehicle traveling trajectory 98 by the own vehicle traveling trajectory generation unit 50 correspond to the trajectory control of Step S8 shown in FIG. 2.

As described above, the traveling control device 300 according to this embodiment connects the first trajectory 79 and the second trajectory 81 to generate the own vehicle traveling trajectory 98 when the own vehicle 101 changes lanes by the override. Then, the traveling control device 300 controls the steering actuator 7 of the own vehicle 101 so that the own vehicle 101 travels following the own vehicle traveling trajectory 98. Thus, when the own vehicle 101 traveling autonomously changes lanes by the override, the traveling control of the own vehicle 101 can smoothly return from the state of the override to the autonomous driving control again. Therefore, the motion of the own vehicle 101 at the time of lane change by override is stabilized.

The first trajectory 79 is generated in accordance with the current steering angle and the current vehicle speed or in accordance with the current yaw rate and the current vehicle speed of the own vehicle 101. Thus, the traveling control device 300 can generate the own vehicle traveling trajectory 98 according to the actual traveling situation and the request of the driver.

In this embodiment, the traveling control device 300 may generate the own vehicle traveling trajectory 98 based on the first trajectory 79 in accordance with the override of the own vehicle 101 and the second travelable area 82 generated to match the shape of the second lane 80 as shown in FIG. 4.

Further, in the first to third embodiments, the own vehicle 101 may change lanes by override after a brief stop in front of the street-parking vehicle 1. Further, when the own vehicle 101 decelerates in front of the street-parking vehicle 1 to change lanes, the deceleration of the own vehicle 101 may be changed according to the steering amount of the driver during the state of the override.

The first lane 70 corresponds to the traveling lane according to the present invention, and the second lane 80 corresponds to the other lane according to the present invention.

DESCRIPTION OF REFERENCE NUMERALS 100,200,300 . . . Traveling control device
101 . . . Own vehicle
1 . . . Street-parking vehicle
20 . . . Override determination unit
30 . . . First trajectory generation unit
31 . . . First travelable area generation unit
40 . . . Second trajectory generation unit
41 . . . Second travelable area generation unit
45 . . . Composition unit
50 . . . Own vehicle traveling trajectory generation unit
60 . . . Route tracking control unit
70 . . . First lane (Traveling lane)
79 . . . First trajectory
73,76 . . . First travelable area
74 . . . Predicted traveling trajectory
80 . . . Second lane (the other lane)
81 . . . Second trajectory
82 . . . Second Travelable Area
95,97,98 . . . Own vehicle traveling trajectory
94,96 . . . Third travelable Area

The invention claimed is:

1. A traveling control method for an own vehicle comprising:
   detecting an override by a driver by detecting that the driver is operating a steering wheel to change lanes to another lane, the override being a state in which manual operation by the driver takes precedence to autonomous operation;
   determining whether the own vehicle traveling autonomously along a traveling lane will change lanes to the other lane different from the traveling lane by the override;
   when determining that the own vehicle will change lanes by the override, transferring to the state in which manual operation by the driver takes precedence to autonomous operation;
   generating a first travelable area in the traveling lane, the first travelable area being an area in which the own vehicle can travel;
   generating a second travelable area in the other lane located in a direction in which the override of the own vehicle is executed, the second travelable area being an area in which the own vehicle can travel;
   generating a third travelable area by connecting the first travelable area and the second travelable area;
   detecting a steering amount inputted by the driver of the own vehicle;
   generating an own vehicle traveling trajectory within the third travelable area based on a predicted traveling trajectory calculated according to the steering amount of the own vehicle by a steering control of the driver in the first travelable area and a trajectory along the other lane in the second travelable area; and then
   controlling a motion of the own vehicle so that the own vehicle travels along the own vehicle traveling trajectory instead of the state in which the manual operation by the driver takes precedence to autonomous operation.

2. The traveling control method for the own vehicle according to claim 1, wherein the first travelable area is generated based on a predicted traveling trajectory in accordance with the override of the own vehicle.

3. The traveling control method for the own vehicle according to claim 2, wherein the first travelable area is generated based on the predicted traveling trajectory calculated from the current steering angle and the current vehicle speed of the own vehicle.

4. The traveling control method for the own vehicle according to claim 2, wherein the first travelable area is generated based on the predicted traveling trajectory calculated from the current yaw rate and the current vehicle speed of the own vehicle.

5. The traveling control method for the own vehicle according to claim 2, wherein the second travelable area is generated from at least a position on a side of the own vehicle in a traveling direction of the traveling lane relative to a position at which the predicted traveling trajectory is contact with the other lane.

6. The traveling control method for the own vehicle according to claim 1, wherein the second travelable area is generated to match a shape of the other lane.

7. The traveling control method for the own vehicle according to claim 1, comprising:
when an obstacle is detected on the traveling lane in front of the own vehicle and the override of the own vehicle is detected, determining that the own vehicle changes lanes to the other lane by the override.

8. The traveling control method for the own vehicle according to claim 1, wherein the first travelable area is generated to match a shape of the traveling lane in which the own vehicle travels.

9. The traveling control method for the own vehicle according to claim 8, comprising:
when an obstacle is detected on the traveling lane in front of the own vehicle and the override of the own vehicle is detected, determining that the own vehicle will change lanes to the other lane by the override, and
generating the first travelable area along the traveling lane up to a point on a side of the obstacle nearest to the own vehicle.

10. The traveling control method for the own vehicle according to claim 1, wherein controlling the motion of the own vehicle so that the own vehicle travels along the own vehicle traveling trajectory comprises:
in the traveling lane, controlling the motion of the own vehicle so that the own vehicle travels in the first travelable area, and
controlling the motion of the own vehicle so that the own vehicle travels in the second travelable area in the other lane.

11. The traveling control method for the own vehicle according to claim 1, comprising controlling the motion of the own vehicle so that the own vehicle decelerates at a timing at which the own vehicle changes lanes by the override.

12. A traveling control method for an own vehicle comprising:
detecting an override by a driver by detecting that the driver is operating a steering wheel to change lanes to another lane, the override being a state in which manual operation by the driver takes precedence to autonomous operation;
determining whether an own vehicle traveling autonomously along a traveling lane will change lanes to the other lane different from the traveling lane by the override;
when it is determined that the own vehicle will change lanes by the override, transferring to the state in which manual operation by the driver takes precedence to autonomous operation;
detecting a steering amount inputted by the driver of the own vehicle;
generating a first trajectory based on a predicted traveling trajectory calculated according to the steering amount of the own vehicle in accordance with the override of the own vehicle;
generating a second travelable area in the other lane located in a direction in which the override of the own vehicle is executed, the second travelable area being an area in which the own vehicle can travel;
generating an own vehicle traveling trajectory based on the first trajectory and the second travelable area; and then
controlling motion of the own vehicle so that the own vehicle travels along the own vehicle traveling trajectory instead of the state in which manual operation by the driver takes precedence to autonomous operation.

13. A traveling control method for an own vehicle comprising:
detecting an override by a driver by detecting that the driver is operating a steering wheel to change lanes to another lane, the override being a state in which manual operation by the driver takes precedence to autonomous operation;
determining whether an own vehicle traveling autonomously along a traveling lane will change lanes to the other lane different from the traveling lane by the override;
when it is determined that the own vehicle will change lanes by the override, transferring to the state in which manual operation by the driver takes precedence to autonomous operation;
detect a steering amount inputted by the driver of the own vehicle;
generating a first trajectory based on a predicted traveling trajectory calculated according to the steering amount of the own vehicle in accordance with the override of the own vehicle;
generating a second trajectory along the other lane different from the traveling lane;
generating an own vehicle traveling trajectory by connecting the first trajectory and the second trajectory; and then
controlling a motion of the own vehicle so that the own vehicle travels along the own vehicle traveling trajectory instead of the state in which manual operation by the driver takes precedence to autonomous operation.

14. The traveling control method for the own vehicle according to claim 13, wherein the first trajectory is generated in accordance with a current steering angle and a current vehicle speed of the own vehicle.

15. The traveling control method for the own vehicle according to claim 13, wherein the first trajectory is generated in accordance with a current yaw rate and a current vehicle speed of the own vehicle.

16. A traveling control device for an own vehicle comprising:
a processor configured to:
detect an override by a driver by detecting that the driver is operating a steering wheel to change lanes to another lane, the override being a state in which manual operation by the driver takes precedence to autonomous operation;
determine whether an own vehicle traveling autonomously along a traveling lane will change lanes to the other lane different from the traveling lane by the override;

when determining that the own vehicle will change lanes by the override, transferring to the state in which manual operation by the driver takes precedence to autonomous operation;

generate a first travelable area in the traveling lane, the first travelable area being an area in which the own vehicle can travel;

generate a second travelable area in the other lane located in a direction in which the override of the own vehicle is executed, the second travelable area being an area in which the own vehicle can travel;

generate a third travelable area by connecting the first travelable area and the second travelable area;

detecting a steering amount inputted by the driver of the own vehicle;

generate an own vehicle traveling trajectory within the third travelable area based on a predicted traveling trajectory calculated according to the steering amount of the own vehicle by a steering control of the driver in the first travelable area and a trajectory along the other lane in the second travelable area; and then control a motion of the own vehicle so that the own vehicle travels along the own vehicle traveling trajectory instead of the state in which manual operation by the driver takes precedence to autonomous operation.

* * * * *